(12) United States Patent
Lai

(10) Patent No.: US 8,253,372 B2
(45) Date of Patent: Aug. 28, 2012

(54) CHARGING SYSTEM AND CHARGING APPARATUS THEREOF

(75) Inventor: Jin-Shi Lai, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 492 days.

(21) Appl. No.: 12/485,936

(22) Filed: Jun. 17, 2009

(65) Prior Publication Data

US 2009/0315511 A1    Dec. 24, 2009

(30) Foreign Application Priority Data

Jun. 20, 2008    (CN) .......................... 2008 1 0302242

(51) Int. Cl.
*H02J 7/00* (2006.01)
(52) U.S. Cl. ........ 320/107; 320/109; 320/110; 320/111; 320/115

(58) Field of Classification Search .................. 320/107, 320/109, 110, 111, 115
See application file for complete search history.

(56) References Cited

U.S. PATENT DOCUMENTS

| 2003/0094922 A1* | 5/2003 | Petersson et al. ............. 320/109 |
| 2008/0042620 A1 | 2/2008 | Udono |
| 2008/0174268 A1* | 7/2008 | Koo et al. ..................... 320/109 |

* cited by examiner

*Primary Examiner* — Samuel Berhanu
(74) *Attorney, Agent, or Firm* — Altis Law Group, Inc.

(57) ABSTRACT

A charging system includes a robot and a charging apparatus. The robot includes a rechargeable battery, a power receiving terminal electrically connecting with the rechargeable battery, and a detector for detecting a voltage of the battery. The charging apparatus for charging the robot includes a base comprising a receiving portion defining a sliding slot, a power supplying terminal disposed in the receiving portion and configured for electrically contacting with the power receiving terminal, a positioning board docked in the receiving portion for loading the robot, and a driving device including an inclined surface contacting with the positioning board via the sliding slot. The detector may send a control signal to the driving device to push the positioning board with the robot up from the receiving portion.

17 Claims, 6 Drawing Sheets

CHARGING SYSTEM AND CHARGING APPARATUS THEREOF

BACKGROUND

1. Technical Field

The present disclosure relates to charging systems, and more particularly to a charging system for a robot.

2. Description of Related Art

Conventional robots generally utilize rechargeable batteries as power sources. When the voltage of a rechargeable battery is lower than a predetermined value, the battery needs to be recharged via a charging apparatus. A robot usually includes an infrared sensor for communicating with the charging apparatus, in order for guiding the robot to move toward the charging apparatus. After approaching the charging apparatus, the robot docks on the charging apparatus. However, because the robot must be firmly held to the charging apparatus to be stably charged, the robot cannot automatically detach from the charging apparatus after the charge operation.

Therefore, a need exits for providing a charging system whereby the robot can separate from a charging apparatus automatically.

DETAILED DESCRIPTION

Figure 1:
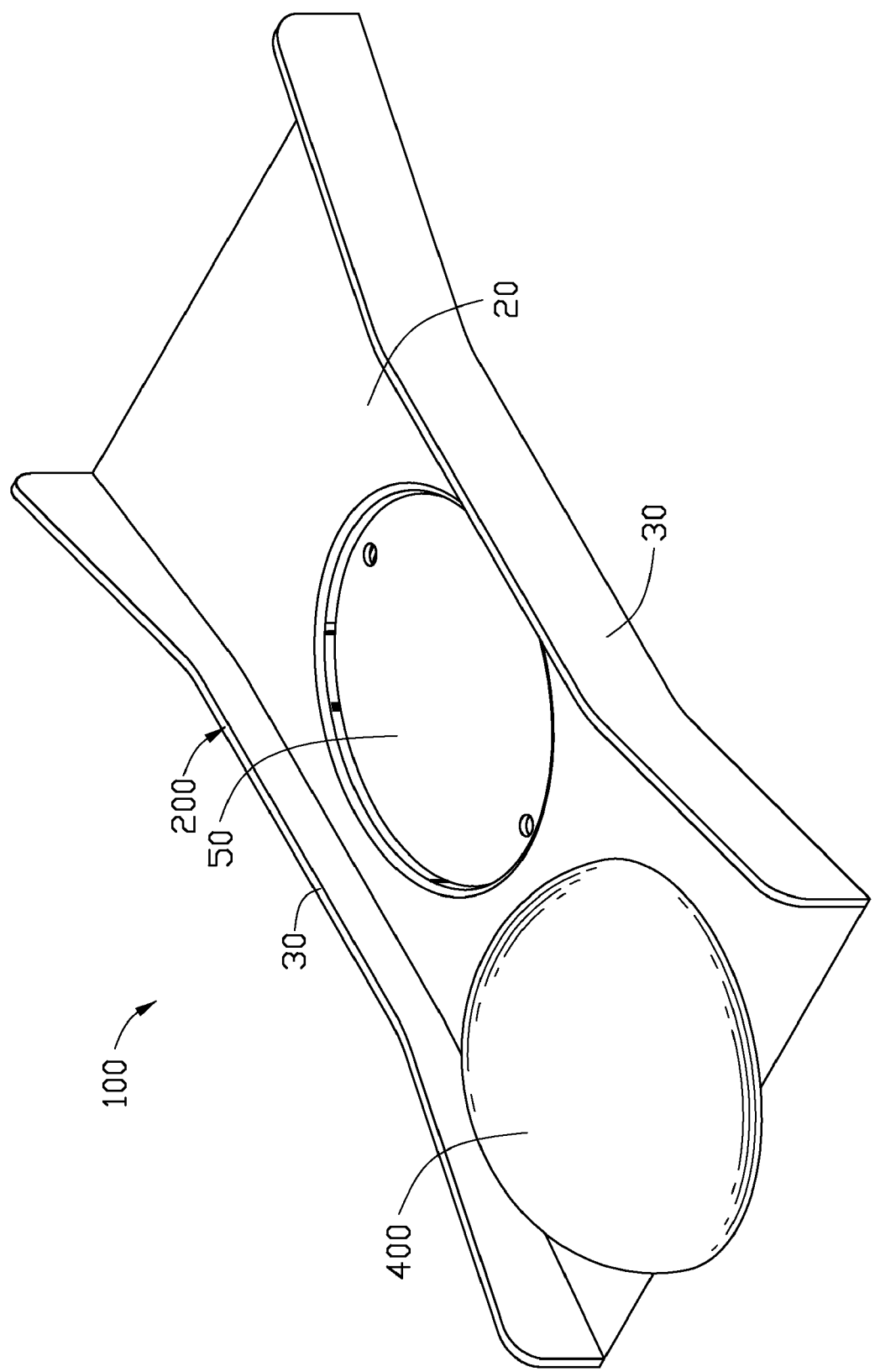
FIG. 1 is an isometric view of a charging system, comprising a robot and a charging apparatus, in accordance with an exemplary embodiment.
Figure 2:
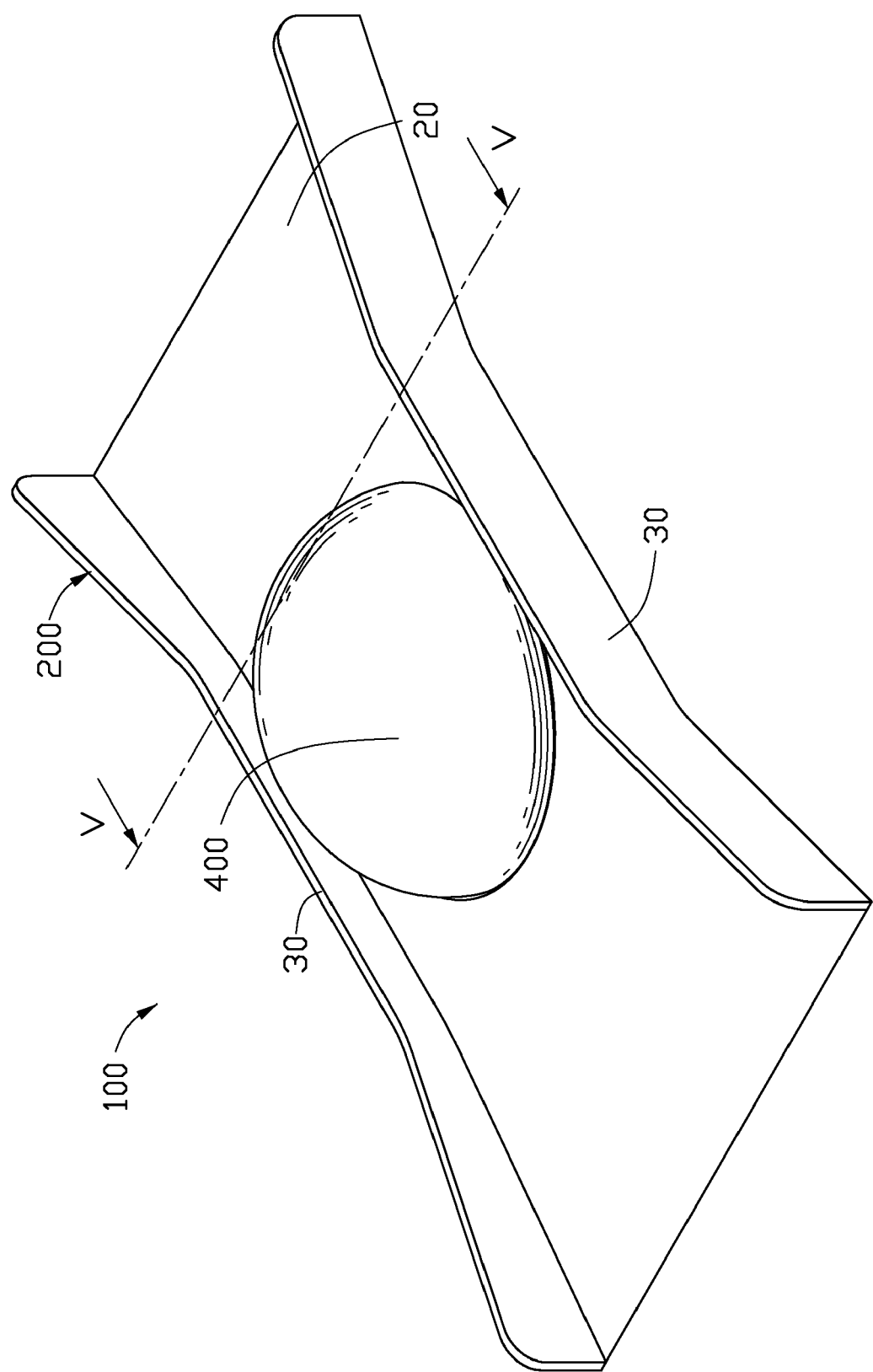
FIG. 2 is an isometric view of the charging system of FIG. 1, with the robot docking in the charging apparatus.

Referring to FIGS. 1 and 2, a charging system 100 in accordance with an exemplary embodiment includes a robot 400 and a charging apparatus 200 detachably connecting with the robot 400 for charging the robot 400.

Figure 3:
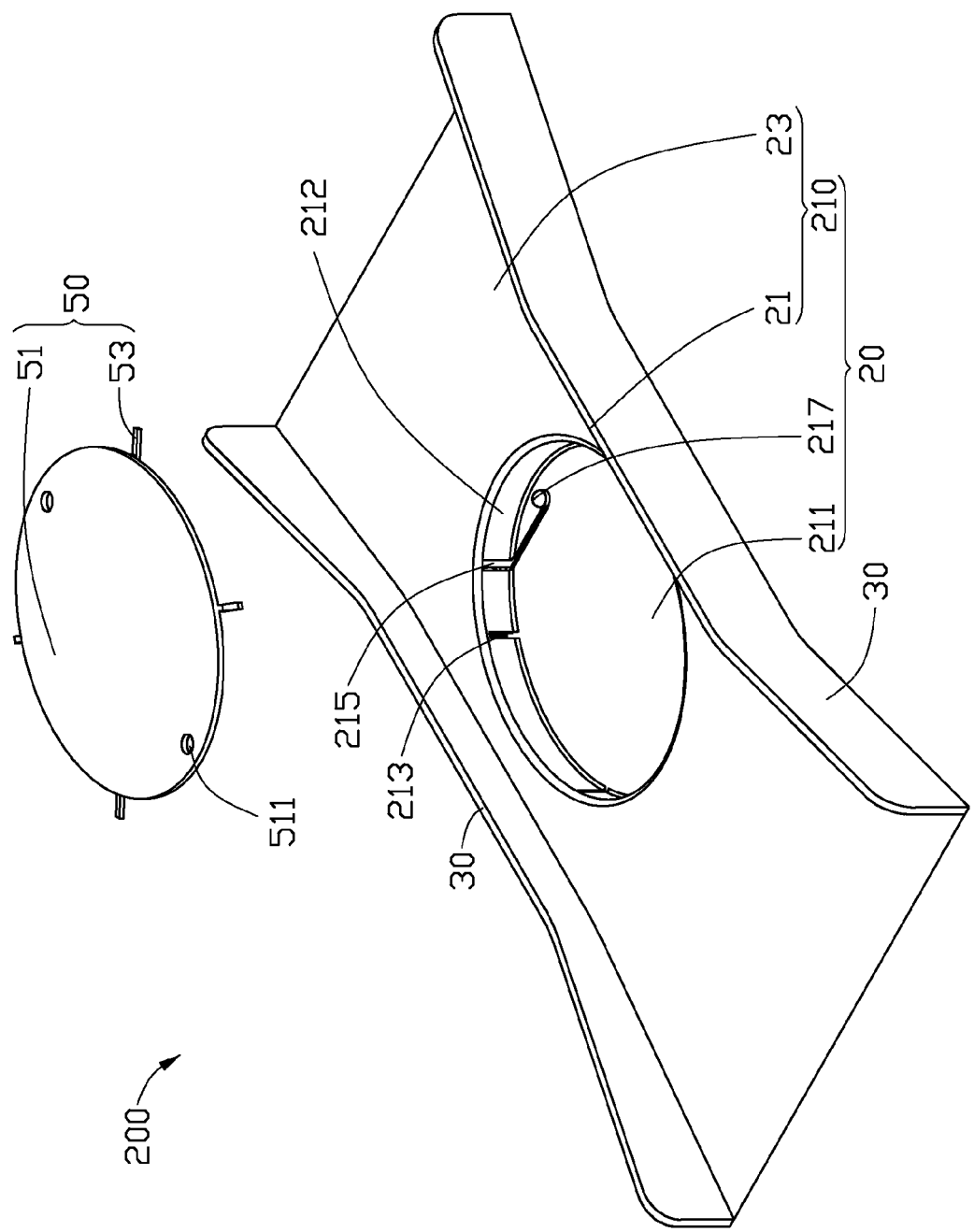
FIG. 3 is an exploded, isometric view of the charging apparatus of FIG. 1.
Figure 4:
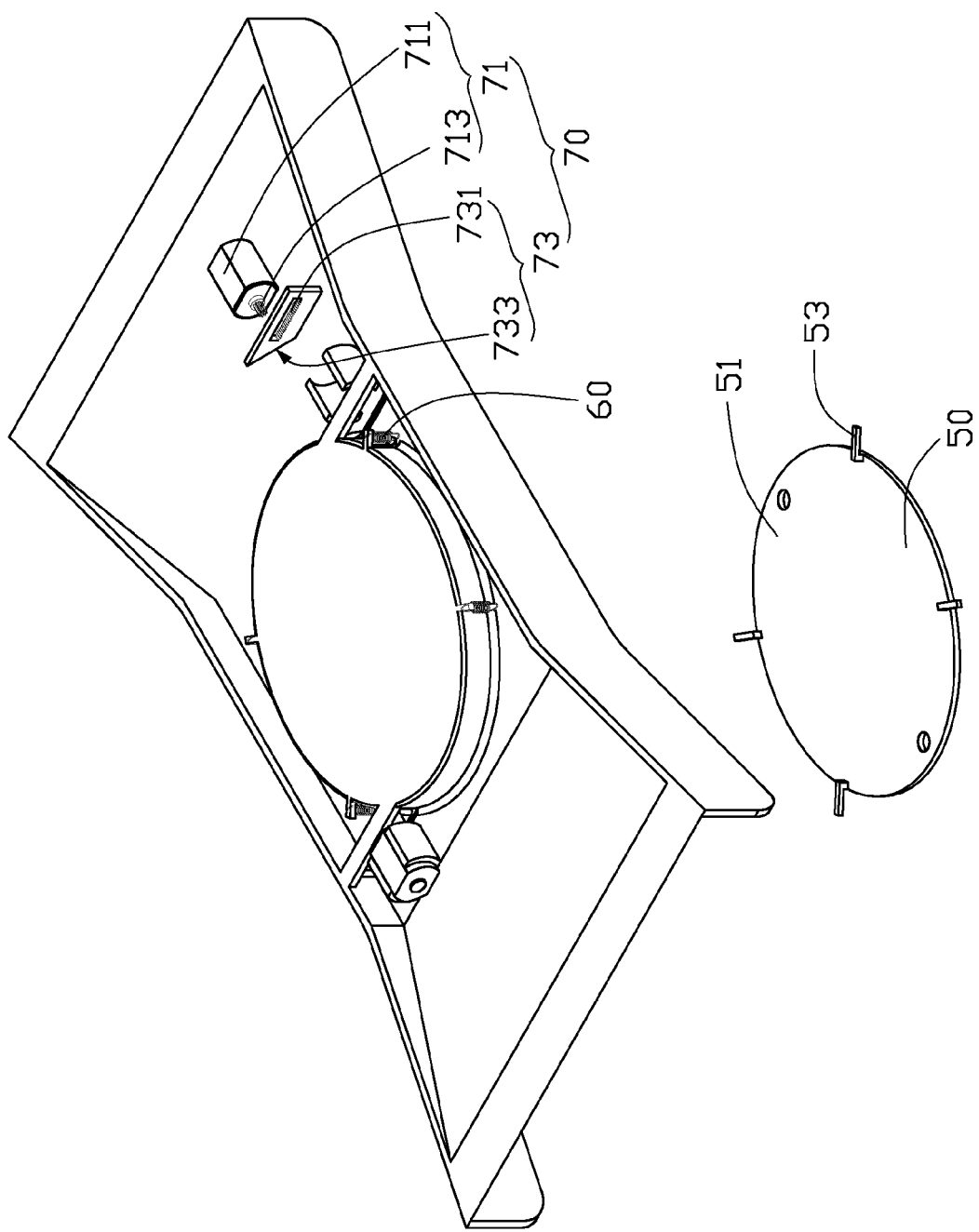
FIG. 4 is a reverse, isometric view of the charging apparatus of FIG. 3.

Referring to FIGS. 3 and 4, the charging apparatus 200 includes a base 20, two supporting walls 30 perpendicularly extending from opposite sides of the base 20, a positioning board 50 movable disposed on the base 20 for loading the robot, a plurality of flexible members 60, and a driving device 70 for driving the positioning board 50 to move.

The base 20 includes a base board 210 and a circular-shaped receiving portion 211 defined inward from a top surface of the base board 210. The base board 210 includes a flat portion 21 and two inclined portions 23 obliquely extending from two ends of the flat portion 21. The receiving portion 211 is disposed at the flat portion 21. Two power supplying terminals 217 are disposed in the receiving portion 211. Therefore, the robot 400 can move into or on the receiving portion 211 from the ground surface (not shown) via one of the inclined portions 23 and the flat portion 21, so as to recharge a rechargeable battery 43 of the robot 400.

Four fixing slots 213 are defined in a sidewall 212 surrounding the receiving portion 211 at an equal interval. Each of the fixing slots 213 extends vertically through the side wall 212. A sliding slot 215 is also defined in the sidewall 212 and through the sidewall 212 to a bottom of the receiving portion 211. The two power supplying terminals 217 are disposed at the bottom of the receiving portion 211. The power supplying terminals 217 are used for electrically connecting with a power supplying source (not shown).

The two supporting walls 30 are used for supporting the base 20 and guiding the robot 400 towards the receiving portion 211.

The positioning board 50 is substantially a flat sheet accommodated in the receiving portion 211. The positioning board 50 includes a circular-shaped main body 51 and four fixing portions 53 protruding horizontally from an edge of the main body 51 at equal intervals. Two through holes 511 correspond to the two power supplying terminals 217 are defined in the main body 51 for allowing the two power supplying terminals 217 to protrude through correspondingly. The four fixing portions 53 corresponding to the four fixing slots 213 are insertable in the four fixing slots 213 respectively. The four fixing portions 53 are movable in a second direction D2 (shown in FIG. 5) with respect to the base 20, such as in a vertical direction.

The plurality of flexible members 60 are disposed at bottom of the base 20. Each of the flexible members 60 has two ends fixed at the receiving portion 211 and positioning board 50 respectively. The flexible members 60 are configured for providing a force to draw the positioning board 50 away while the positioning board 50 is pushed out from the receiving portion 211 along the second direction D2 (shown in FIG. 5).

Figure 5:
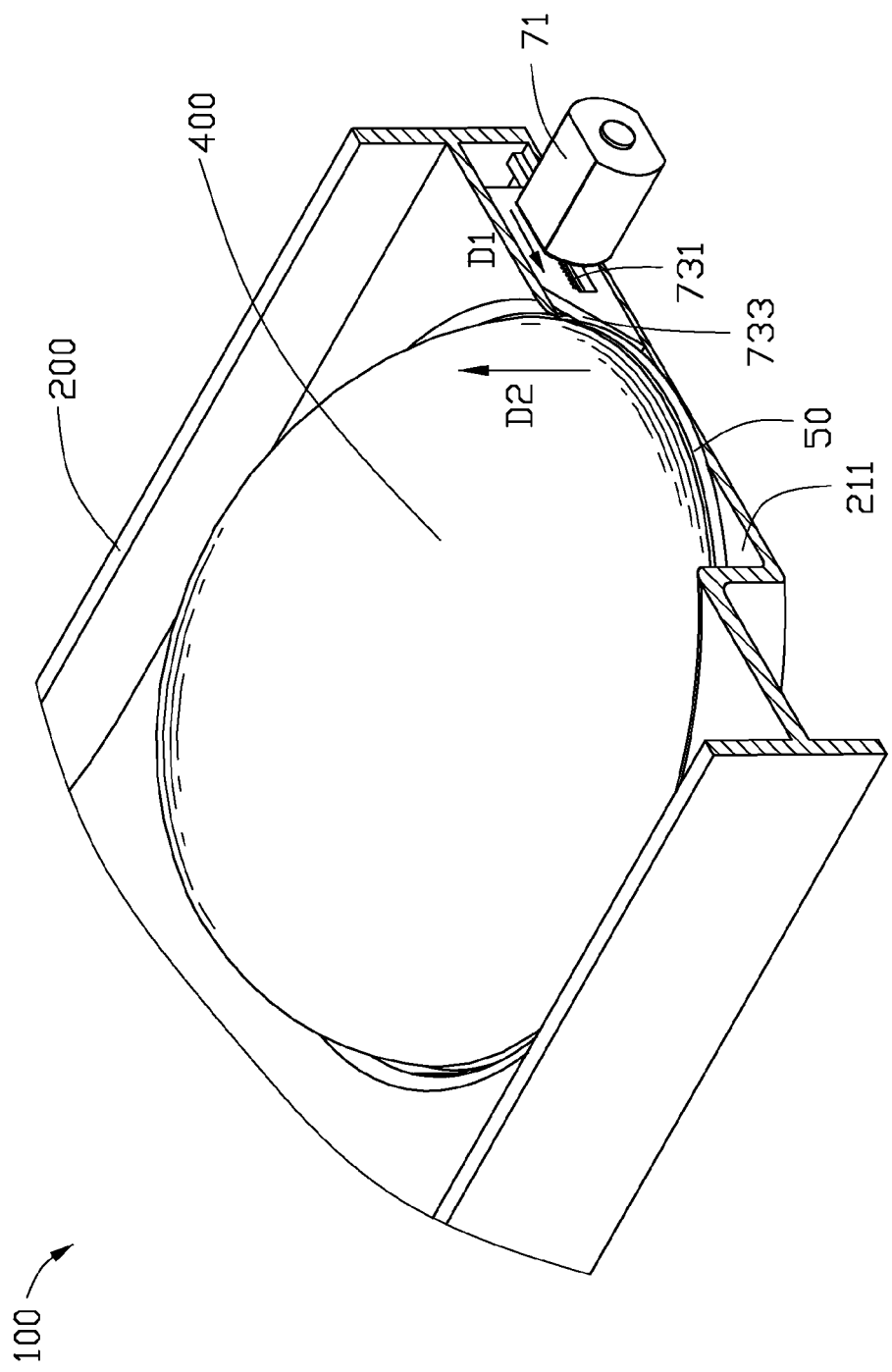
FIG. 5 is a cross-sectional isometric view of the charging system of FIG. 2, taken along the line V-V, but also showing the motor.
Figure 6:
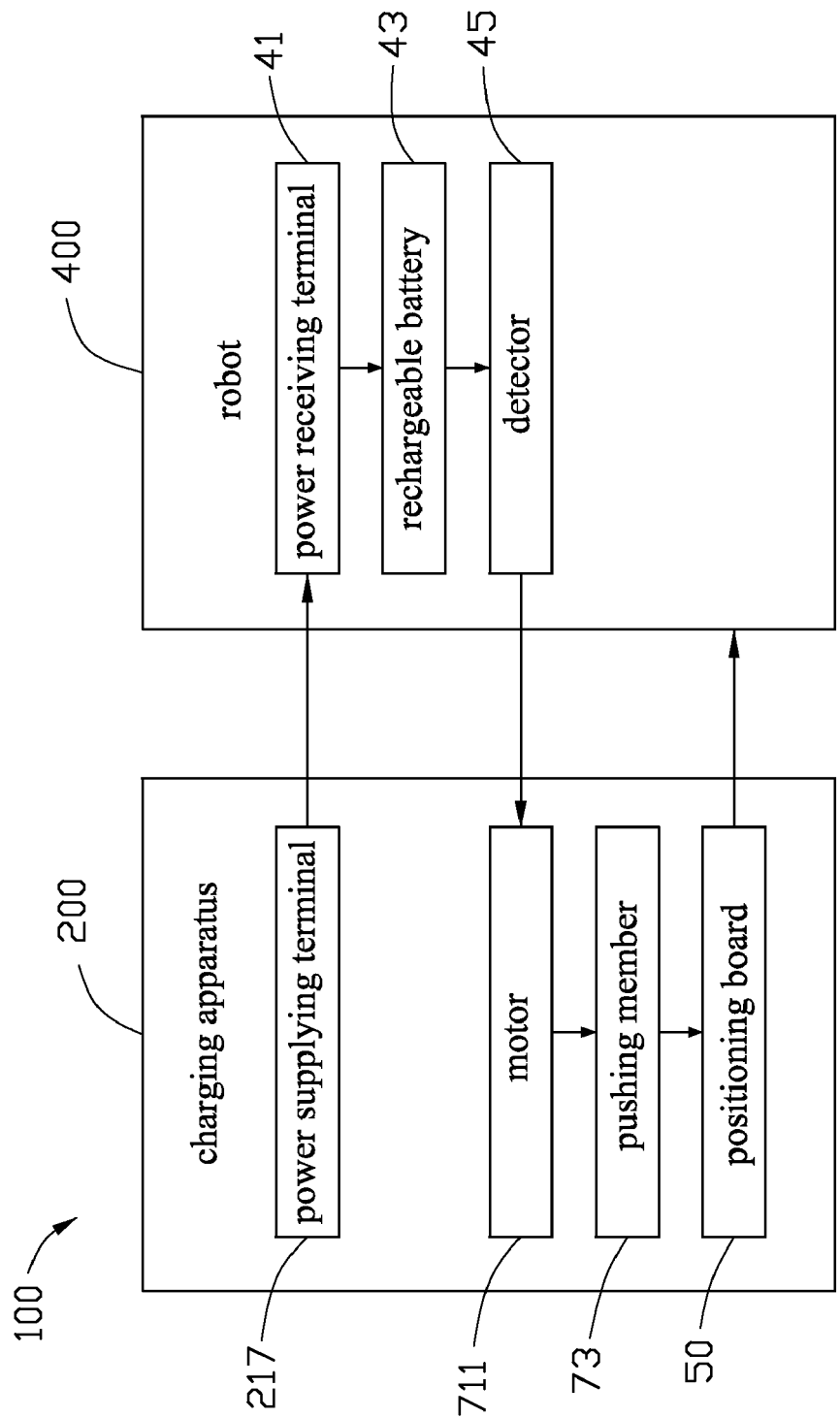
FIG. 6 is a block diagram of the charging system of FIG. 5.

Further referring to FIGS. 5 and 6, the driving device 70 (of FIG. 4) includes a pushing member 73 capable of pushing the positioning board 50 and a driver 71 capable of driving the pushing member 73. The pushing member 73 is disposed at the bottom of the base 20 and is inserted into the slide slot 215 to contact with the positioning board 50. The pushing member 73 may be a flat board including a rack 731 and an inclined surface 733 resisting the positioning board 50 and for pushing the positioning board 50 to move in the second direction D2.

The driver 71 includes a motor 711 and a gear 713 connected with the motor 711. The gear 713 is used for engaging with the rack 731 of the pushing member 73 to drive the pushing member 73 to move in a first direction D1, such as a horizontal direction.

The robot 400 includes two power receiving terminals 41 (FIG. 6) disposed at the bottom thereof, the rechargeable battery 43 (FIG. 6) installed therein and electrically connected with the power receiving terminals 41, and a detector 45 for detecting the voltage of the rechargeable battery 43.

The two power receiving terminals 41 correspond to the power supplying terminals 217 of the charging apparatus 200. If the two power supplying terminals 217 are plugged into the two power receiving terminals 41, the rechargeable battery 43 may be charged.

The detector 45 is used for detecting the voltage of the rechargeable battery 43. When the detected voltage of the rechargeable battery 43 reaches a predetermined level, the charging of the rechargeable battery is discontinued and the detector 45 generates a first control signal. The motor 711 is enabled according to the control signal. The pushing member 73 is then driven by the motor 711 to move along the first direction D1. The positioning board 50 is then lifted up by the pushing member 73 so as to release the robot 400 from the receiving portion 211. Therefore, the robot 400 may move away from the charging apparatus 200 automatically.

It is to be understood, however, that even though numerous characteristics and advantages of the present disclosure have been set forth in the foregoing description, together with details of the structure and function of the present disclosure, the present disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A charging system comprising:
   a robot comprising:
      a rechargeable battery;
      a power receiving terminal electrically connecting with the rechargeable battery; and
      a detector for detecting a voltage of the rechargeable battery; and
   a charging apparatus for charging the robot, comprising:
      a base comprising a receiving portion defining a sliding slot;
      a power supplying terminal disposed in the receiving portion and configured for electrically contacting with the power receiving terminal;
      a positioning board docked in the receiving portion for loading the robot; and
      a driving device comprising an inclined surface contacting with the positioning board via the sliding slot and for pushing the positioning board out from the receiving portion;
      wherein when the detected voltage of the rechargeable battery reaches a predetermined level, the detector generates a control signal and sends the control signal to the driving device to push the positioning board with the robot up from the receiving portion.

2. The charging system as claimed in claim 1, wherein: the driving device comprises a pushing member capable of pushing the positioning board and a driver capable of driving the pushing member; and the inclined surface is disposed on the pushing member.

3. The charging system as claimed in claim 2, wherein: the driver comprises a motor and a gear driven by the motor; and the pushing member comprises a rack engaging with the gear to drive the pushing member to move.

4. The charging system as claimed in claim 1, wherein the receiving portion is formed inward from a top surface of the base.

5. The charging system as claimed in claim 4, wherein: a fixing slot is defined in a side wall of the receiving portion; and the positioning board comprises a fixing portion insertable through the fixing slot.

6. The charging system as claimed in claim 5, wherein: the sliding slot is defined in the side wall and a bottom of the receiving portion; and the driving device is disposed at the bottom of the base.

7. The charging system as claimed in claim 5, wherein a flexible member elastically connects the fixing portion of the positioning board and the receiving portion, and is configured for providing a force to draw the positioning board away while the positioning board is pushed out from the receiving portion.

8. The charging system as claimed in claim 1, wherein: the base comprises a flat portion and two inclined portions connected to the flat portion; and the receiving portion is disposed on the flat portion.

9. The charging system as claimed in claim 1, wherein: the power receiving terminal is disposed at the bottom of the robot; the power supplying terminal is disposed at the bottom of the receiving portion; and a through hole corresponding to the power supplying terminal is defined in the positioning board for allowing the power supplying terminal to protrude therethrough to electrically contact the power receiving terminal.

10. A charging apparatus for a robot, the robot comprising a detector for detecting a voltage of a battery of the robot and generating a control signal when the detected voltage reaches a predetermined value, the charging apparatus comprising:
   a receiving portion defining a slide slot in a side wall thereof;
   a power supplying terminal disposed in the receiving portion;
   a positioning board accommodated in the receiving portion; and
   a driving device comprising an inclined surface resisting the positioning board through the slide slot and for pushing the positioning board out from the receiving portion;
   wherein when the detected voltage of the battery reaches the predetermined level and the detector generates a control signal and sends the control signal to the driving device, the driving device pushes the positioning board with the robot up from the receiving portion.

11. The charging apparatus as claimed in claim 10, wherein the charging apparatus further includes a flexible member connecting the positioning board to the receiving portion.

12. The charging apparatus as claimed in claim 11, wherein: the side wall of the receiving portion defines a fixing slot; and the positioning board comprises a fixing portion received in the fixing slot.

13. The charging apparatus as claimed in claim 10, wherein: the driving device comprises a pushing member capable of pushing the positioning board and a driver capable of driving the pushing member; and the inclined surface is disposed on the pushing member.

14. The charging apparatus as claimed in claim 13, wherein the pushing member driven by the driver moves in a first direction to push the positioning board move in a second direction perpendicular to the first direction.

15. A charging apparatus for a robot, the robot comprising a detector for detecting a voltage of a battery of the robot and generating a control signal when the detected the voltage reaches a predetermined value, the charging apparatus comprising:
   a base forming a recessed receiving portion defining a sliding slot;
   a power supplying terminal mounted in the receiving portion;
   a positioning board for loading the robot, the positioning board movably received in the receiving portion and switchable between the receiving portion and out of the receiving portion; and
   a driving device comprising an inclined surface contacting with the poisoning board via the sliding slot and for pushing the position board out from the receiving portion;
   wherein when the detected voltage of the battery reaches the predetermined level and the detector generates a control signal and sends the control signal to the driving device, the driving device pushes the positioning board with the robot up from the reeving portion.

16. The charging apparatus as claimed in claim 15, wherein: the driving device comprises a motor and a pushing member driven by the motor to move along a first direction; and the pushing member cooperates the positioning board to move the positioning board along a second direction which is perpendicular to the first direction.

17. The charging apparatus as claimed in claim 16, wherein the pushing member comprises the inclined surface contacting with the positioning board.

* * * * *